(12) United States Patent
Xu et al.

(10) Patent No.: US 9,001,280 B2
(45) Date of Patent: Apr. 7, 2015

(54) DEVICES AND METHODS FOR SHIELDING DISPLAYS FROM ELECTROSTATIC DISCHARGE

(75) Inventors: Ming Xu, Cupertino, CA (US); Zhibing Ge, Sunnyvale, CA (US); Cheng-Ho Yu, Cupertino, CA (US); Cheng Chen, Cupertino, CA (US); Abbas Jamshidi-Roudbari, Sunnyvale, CA (US); Lynn Richard Youngs, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 13/603,151

(22) Filed: Sep. 4, 2012

(65) Prior Publication Data

US 2013/0329171 A1    Dec. 12, 2013

Related U.S. Application Data

(60) Provisional application No. 61/657,682, filed on Jun. 8, 2012.

(51) Int. Cl.
| | |
|---|---|
| *G02F 1/1335* | (2006.01) |
| *G02F 1/1343* | (2006.01) |
| *G06F 1/16* | (2006.01) |
| *G06F 1/18* | (2006.01) |
| *G06F 3/041* | (2006.01) |

(Continued)

(52) U.S. Cl.
CPC ............ *G02F 1/134363* (2013.01); *G02F 2001/133334* (2013.01); *G02F 2202/22* (2013.01); *G06F 1/1601* (2013.01); *G06F 1/182* (2013.01); *G06F 3/041* (2013.01); *G09G 3/36* (2013.01); *G09G 2300/0426* (2013.01); *G09G 2330/04* (2013.01); *Y10T 29/49002* (2015.01)

(58) Field of Classification Search
USPC ..................... 349/12, 141, 149–152
See application file for complete search history.

(56) References Cited

U.S. PATENT DOCUMENTS

| 5,870,160 A | * | 2/1999 | Yanagawa et al. ............ 349/141 |
| 6,597,414 B1 | | 7/2003 | Hasegawa |
| 8,259,250 B2 | * | 9/2012 | Sato ................................ 349/58 |

(Continued)

FOREIGN PATENT DOCUMENTS

| CN | 202232021 U | 5/2012 |
| EP | 2325690 A2 | 5/2011 |

(Continued)

OTHER PUBLICATIONS

International Search Report and Written Opinion for PCT No. PCT/US163/44586 dated Sep. 19, 2013; 9 pgs.

(Continued)

*Primary Examiner* — James Dudek
(74) *Attorney, Agent, or Firm* — Fletcher Yoder PC (57) ABSTRACT

Methods and devices for shielding displays from electrostatic discharge (ESD) are provided. In one example, a display of an electronic device may include a high resistivity shielding layer configured to protect electrical components from static charges. The display may also include a conductive layer electrically coupled to the high resistivity shielding layer and configured to decrease a discharge time of static charges from the high resistivity shielding layer. The display may include a grounding layer and a conductor electrically coupled between the conductive layer and the grounding layer to direct static charges from the conductive layer to the grounding layer.

27 Claims, 6 Drawing Sheets

(51) Int. Cl.
  *G09G 3/36* (2006.01)
  *G02F 1/1333* (2006.01)

(56) References Cited

U.S. PATENT DOCUMENTS

| | | |
|---|---|---|
| 2007/0257339 A1 | 11/2007 | Chen et al. |
| 2008/0151167 A1 | 6/2008 | Aota et al. |
| 2009/0184404 A1 | 7/2009 | Jow |
| 2009/0279009 A1 | 11/2009 | Imai et al. |
| 2010/0001973 A1 | 1/2010 | Hotelling et al. |
| 2010/0214247 A1 | 8/2010 | Tang et al. |
| 2011/0102719 A1 | 5/2011 | Kakehi et al. |
| 2011/0255850 A1 | 10/2011 | Dinh et al. |

FOREIGN PATENT DOCUMENTS

| | | |
|---|---|---|
| KR | 2005083433 A | 8/2005 |
| TW | 201140529 A | 11/2011 |

OTHER PUBLICATIONS

Taiwanese Office Action for Taiwanese Application No. 102120396, dated Aug. 4, 2014; 6 pgs.

* cited by examiner

DEVICES AND METHODS FOR SHIELDING DISPLAYS FROM ELECTROSTATIC DISCHARGE

CROSS REFERENCE TO RELATED APPLICATIONS

This application is a Non-Provisional Patent Application of U.S. Provisional Patent Application No. 61/657,682, entitled "Devices and Methods for Shielding Displays from Electrostatic Discharge", filed Jun. 8, 2012, which is herein incorporated by reference.

BACKGROUND

The present disclosure relates generally to electronic displays and, more particularly, to devices and methods for shielding displays from electrostatic discharge (ESD).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Displays, such as liquid crystal displays (LCDs) and organic light emitting diode (OLED) displays, are commonly used in a wide variety of electronic devices, including such consumer electronics as televisions, computers, and handheld devices (e.g., cellular telephones, audio and video players, gaming systems, and so forth). Such display panels typically provide a display in a relatively thin package that is suitable for use in a variety of electronic goods.

As may be appreciated, a static charge may contact the display of the electronic device during normal operation of the electronic device (e.g., via human skin rubbing against the display, an object rubbing against a protective film of the display, and so forth), or during testing of the electronic device (e.g., using a tool to apply ESD to the electronic device). The display may be formed using certain layers that are used to shield the display from ESD. For example, a high resistivity material may be used to shield the display from ESD. In such configurations, the shielding material may not adequately shield the display from ESD, thereby interfering with an image quality of the display. In contrast, if a layer of material has too low of a resistivity, touch functionality of the display may be adversely affected. For example, touches may be sensed when they do not occur.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to devices and methods for shielding displays from electrostatic discharge (ESD). By way of example, a display of an electronic device may include a high resistivity shielding layer configured to protect electrical components from static charges. The display may also include a conductive layer electrically coupled to the high resistivity shielding layer and configured to decrease a discharge time of static charges from the high resistivity shielding layer. The display may include a grounding layer and a conductor electrically coupled between the conductive layer and the grounding layer to direct static charges from the conductive layer to the grounding layer.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to electronic devices incorporating a shielding layer of material within an electronic display to shield the electronic display from electrostatic discharge (ESD). Specifically, the shielding layer is electrically coupled to a grounding surface to dissipate static charges from the shielding layer to the grounding surface. If the shielding layer has a resistivity (e.g., resistance) that is too high, the shielding layer may not properly shield the electronic display from static charges. For example, discharge mura may be induced by a static charge. Accordingly, there may be a long discharge time to dissipate the static charge. The long discharge time may result in image artifacts appearing in images of the display. For example, static charge accumulation on the display may cause flicker, vertical artifacts, and/or horizontal artifacts resulting in a decrease in the quality of the image being displayed. In contrast, if the shielding layer has a resistivity that is too low, touch functions of the display may be adversely affected. For example, a touch may be sensed when a touch does not occur. As another example, a single touch may be sensed in multiple locations.

To decrease a discharge time of static charges present at a high resistivity shielding layer, and thereby reduce the undesirable results that may occur from static charge accumulation, a conductive layer may be electrically coupled to the high resistivity shielding layer. The conductive layer may also be coupled to a grounding layer via a conductor electrically coupled between the conductive layer and the grounding layer to direct static charges from the conductive layer to the grounding layer. For example, a conductive layer of conductive dots, one or more conductive bars, a conductive ring, and so forth may be used to decrease a discharge time of static charges from the high resistivity shielding layer to the grounding layer. Accordingly, static charges may be dissipated to reduce the occurrence of image artifacts.

Figure 1:
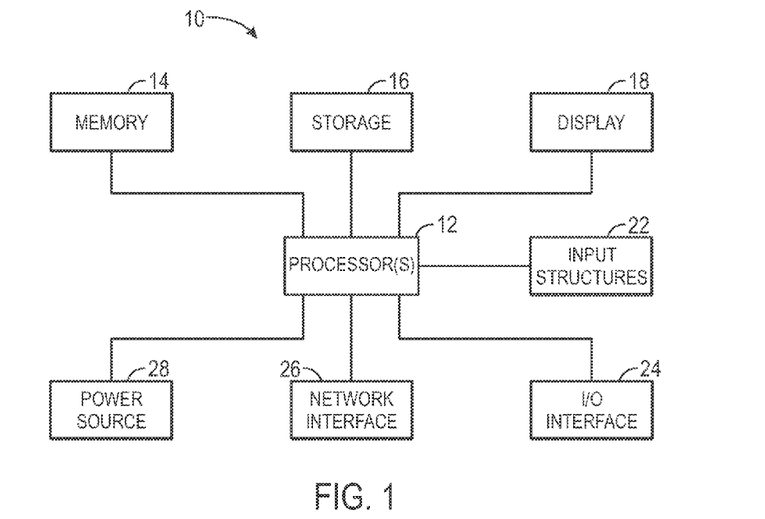
FIG. 1 is a schematic block diagram of an electronic device with an electronic display having an electrostatic discharge (ESD) shielding layer which may be coupled to a conductive layer to decrease a discharge time of static charges applied to the shielding, in accordance with an embodiment.
Figure 2:
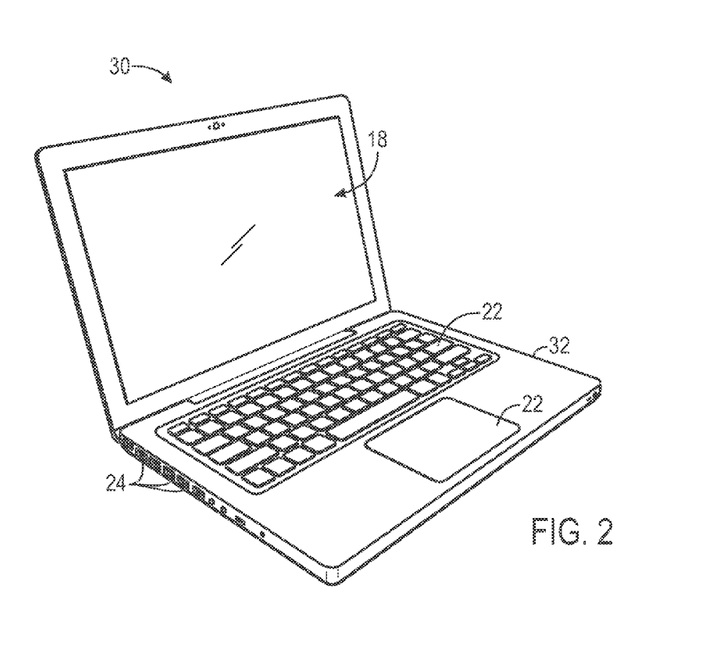
FIG. 2 is a perspective view of a notebook computer representing an embodiment of the electronic device of FIG. 1.
Figure 3:
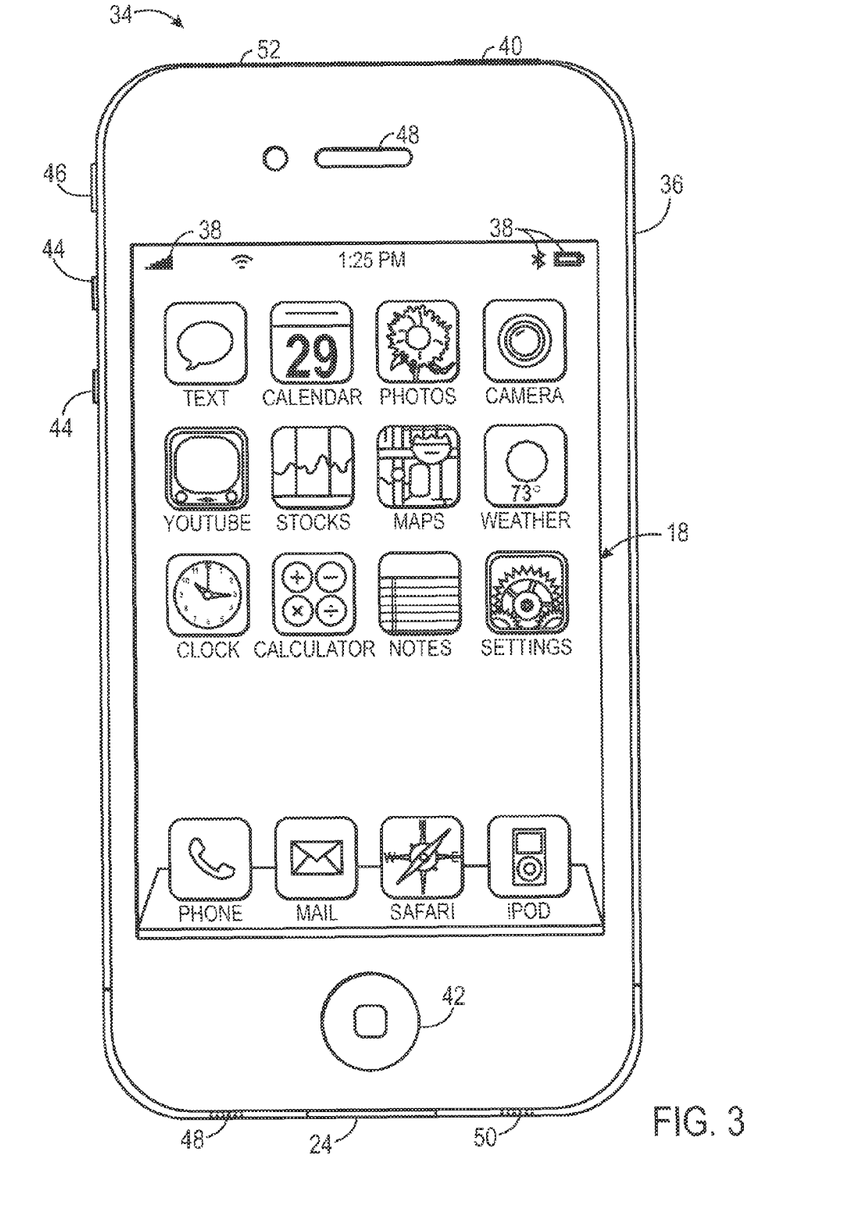
FIG. 3 is a front view of a handheld device representing another embodiment of the electronic device of FIG. 1.

With the foregoing in mind, a general description of suitable electronic devices that may employ a display having a conductive layer electrically coupled to a high resistivity shielding layer will be provided below. In particular, FIG. 1 is a block diagram depicting various components that may be present in an electronic device suitable for incorporating such a display. FIGS. 2 and 3 respectively illustrate perspective and front views of a suitable electronic device, which may be, as illustrated, a notebook computer or a handheld electronic device.

Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10. As may be appreciated, the display 18 may include a conductive layer electrically coupled to a high resistivity shielding layer to quickly dissipate a static charge from the shielding layer to a grounding layer. As such, embodiments of the present disclosure may be employed to reduce image artifacts from occurring on the display 18 due to ESD.

By way of example, the electronic device 10 may represent a block diagram of the notebook computer depicted in FIG. 2, the handheld device depicted in FIG. 3, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may control the electronic display 18.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a MultiTouch™ display that can detect multiple touches at once. The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interfaces 26. The network interfaces 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30, is illustrated in FIG. 2 in accordance with one embodiment of the present disclosure. The depicted computer 30 may include a housing 32, a display 18, input structures 22, and ports of an I/O interface 24. In one embodiment, the input structures 22 (such as a keyboard and/or touchpad) may be used to interact with the computer 30, such as to start, control, or operate a GUI or applications running on the computer 30. For example, a keyboard and/or touchpad may allow a user to navigate a user interface or application interface displayed on the display 18. Further, the display 18 of the computer 30 may include a conductive layer electrically coupled to a high resistivity shielding layer to quickly dissipate a static charge from the shielding layer to a grounding layer as described in detail below.

FIG. 3 depicts a front view of a handheld device 34, which represents one embodiment of the electronic device 10. The handheld device 34 may represent, for example, a portable phone, a media player, a personal data organizer, a handheld game platform, or any combination of such devices. By way of example, the handheld device 34 may be a model of an iPod® or iPhone® available from Apple Inc. of Cupertino, Calif. In other embodiments, the handheld device 34 may be a tablet-sized embodiment of the electronic device 10, which may be, for example, a model of an iPad® available from Apple Inc.

The handheld device 34 may include an enclosure 36 to protect interior components from physical damage and to shield them from electromagnetic interference. The enclosure 36 may surround the display 18, which may display indicator icons 38. The indicator icons 38 may indicate, among other things, a cellular signal strength, Bluetooth connection, and/or battery life. The I/O interfaces 24 may open through the enclosure 36 and may include, for example, a proprietary I/O port from Apple Inc. to connect to external devices.

User input structures 40, 42, 44, and 46, in combination with the display 18, may allow a user to control the handheld device 34. For example, the input structure 40 may activate or deactivate the handheld device 34, the input structure 42 may navigate a user interface to a home screen, a user-configurable application screen, and/or activate a voice-recognition feature of the handheld device 34, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. As mentioned above, the display 18 of the handheld device 34 may include a conductive layer electrically coupled to a high resistivity shielding layer to quickly dissipate a static charge from the shielding layer to a grounding layer.

Figure 4:
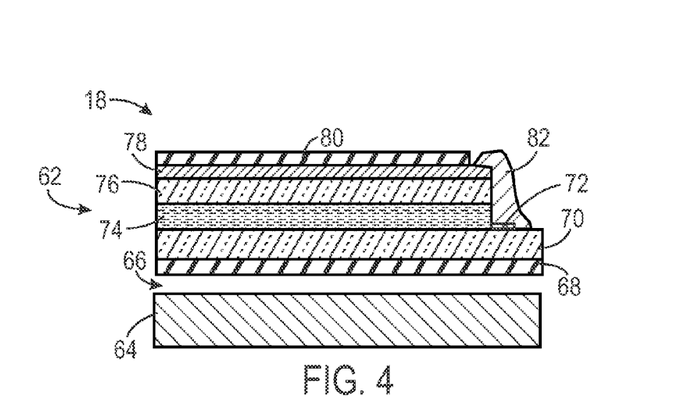
FIG. 4 is a cross-sectional view of layers of a display panel of an electronic display illustrating a shielding layer being formed between a color filter layer and a polarizer, in accordance with an embodiment.

To protect the display 18 of the electronic device 10 from ESD, a shielding layer may be formed between various layers of the display 18. For example, FIG. 4 illustrates one embodiment of the display 18 that includes a shielding layer. Specifically, the display 18 includes a display panel 62 positioned over a backlight assembly 64. The display panel 62 includes multiple layers that form pixels of the display 18. The backlight assembly 64 directs light through the pixels of the display panel 62 via a transparent medium 66 (e.g., gas, fluid) between the backlight assembly 64 and the display panel 62.

As illustrated, the display panel 62 includes a rear polarizer 68 positioned adjacent to the backlight assembly 64. The rear polarizer 68 (e.g., polarizing layer) polarizes light emitted by the backlight assembly 64. Moreover, a thin film transistor (TFT) layer 70 is formed over the rear polarizer 68. For simplicity, the TFT layer 70 is depicted as a generalized structure in FIG. 4. In practice, the TFT layer 70 may itself include various conductive, non-conductive, and semiconductive layers and structures that generally form the electrical devices and pathways that drive the operation of the pixels. In certain embodiments, the TFT layer 70 may be formed to use fringe field switching (FFS) or in-plane switching (IPS). As illustrated, a grounding layer 72 is formed over the TFT layer 70. The grounding layer 72 may be used to ground portions of the display panel 62. As such, the grounding layer 72 may be coupled to a reference signal of the display panel 62, the display 18, and/or the electronic device 10. In some embodiments, the grounding layer 72 may be formed as part of the TFT layer 70. As may be appreciated, the TFT layer 70 may also include a substrate layer (e.g., formed from a light-transparent material, such as glass, quartz, and/or plastic) at the interface with the rear polarizer 68 and an alignment layer (e.g., formed from polyimide or other suitable materials) at the interface with a liquid crystal layer 74.

The liquid crystal layer 74 includes liquid crystal particles or molecules suspended in a fluid or gel matrix. The liquid crystal particles may be oriented or aligned with respect to an electrical field generated by the TFT layer 70. The orientation of the liquid crystal particles in the liquid crystal layer 74 determines an amount of light transmission through pixels of the display panel 62. Thus, by modulation of the electrical field applied to the liquid crystal layer 74, the amount of light transmitted though the pixels may be correspondingly modulated.

Disposed over the liquid crystal layer 74 is a color filter layer 76. As may be appreciated, the color filter layer 76 may include one or more alignment and/or overcoating layers interfacing the liquid crystal layer 74 with the color filter layer 76. Furthermore, the color filter layer 76 may include a red, green, or blue filter, for example. Thus, each pixel of the display panel 62 may correspond to a primary color when light is transmitted from the backlight assembly 64 through the liquid crystal layer 74 and the color filter layer 76. It should be noted that the color filter layer 76 may include a substrate (e.g., formed from light-transmissive glass, quartz, and/or plastic).

In the illustrated embodiment, a high resistivity (e.g., high resistance) shielding layer 78 is disposed over the color filter layer 76 and between the color filter layer 76 and a front polarizer 80 (e.g., a polarizing layer to polarize light emitted by the backlight assembly 64). The high resistivity shielding layer 78 may have any suitable resistance for providing ESD protection to the display panel 62 (e.g., display layers, touch layers, electrical components, etc.). For example, the high resistivity shielding layer 78 may have a sheet resistance of approximately 100 to 1,000 ohms per square, 1,000 to 1,000,000 ohms per square, or 1,000,000 to 10,000,000,000 ohms per square. Furthermore, the high resistivity shielding layer 78 may be formed from any suitable material. For example, the high resistivity shielding layer 78 may be formed from a material such as indium tin oxide (ITO) and/or indium zinc oxide (IZO).

The high resistivity shielding layer 78 is electrically coupled to the grounding layer 72 via a conductor 82 to direct static charges from the high resistivity shielding layer 78 to the grounding layer 72. The conductor 82 may be formed from any suitable conductive material (e.g., silver, silver paste, copper, conductive tape, and so forth) to electrically couple the high resistivity shielding layer 78 to the grounding layer 72.

As may be appreciated, because of the high resistivity of the shielding layer 78, it may take longer than desired to dissipate a static charge that is present on the high resistivity shielding layer 78. Accordingly, a low resistance conductive layer may be formed between the high resistivity shielding layer 78 and the conductor 82 to decrease the time it takes to dissipate static charges.

Figure 5:
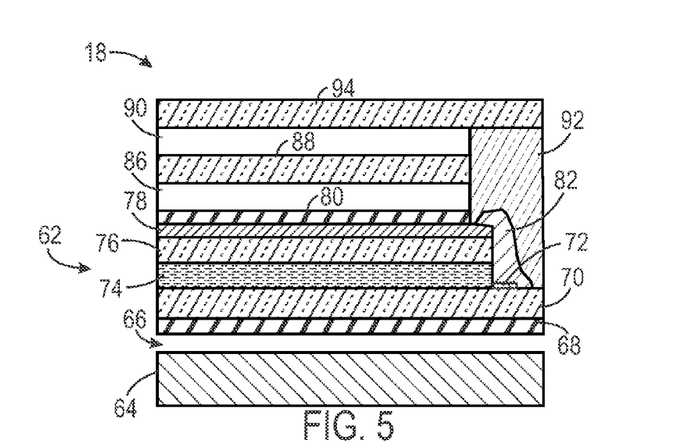
FIG. 5 is a cross-sectional view of layers of a display panel of an electronic display illustrating a shielding layer being formed between a color filter layer and a polarizer with a touch layer formed between the polarizer and a cover glass, in accordance with an embodiment.

The high resistivity shielding layer 78 may be formed between various layers of the display panel 62. For example, FIG. 5 illustrates a cross-sectional view of layers of the display panel 62 with the high resistivity shielding layer 78 formed between the color filter layer 76 and the front polarizer 80. In the present embodiment, the display panel 62 includes a touch layer formed over the front polarizer 80. Specifically, a layer 86 (e.g., air gap, adhesive, optically-clear adhesive (OCA)) is formed over the front polarizer 80 and a touch layer 88 (e.g., touch panel) is formed over the layer 86 to sense touches that occur. Furthermore, a layer 90 (e.g., air gap, adhesive, OCA) is formed over the touch layer 88. Moreover, a filler material 92 is formed over a portion of the TFT layer 70, and adjacent to the front polarizer layer 80, the layer 86, the touch layer 88, and the layer 90. In addition, a cover glass layer 94 is formed over the layer 90 and the filler material 92. As illustrated, the high resistivity shielding layer 78 is formed within the display panel 62 so that is may provide shielding to the TFT layer 70, but not to the touch layer 88. Accordingly, the touch layer 88 may be affected by ESD.

Figure 6:
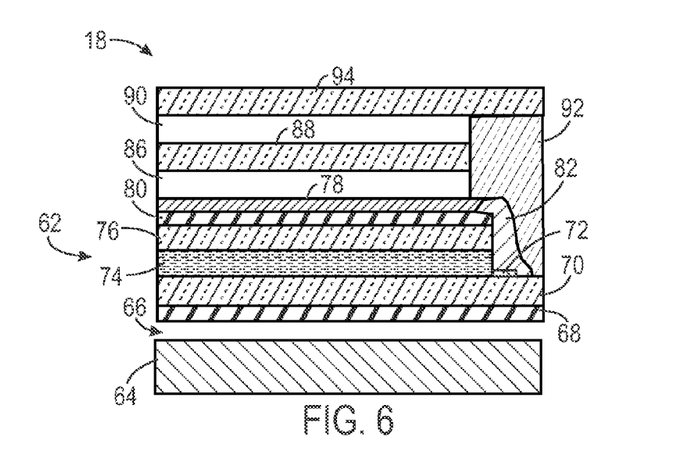
FIG. 6 is a cross-sectional view of layers of a display panel of an electronic display illustrating a shielding layer being formed between a polarizer and a touch layer, in accordance with an embodiment.

The ESD protection provided by the high resistivity shielding layer 78 may be improved by forming the shielding layer 78 over the front polarizer 80. Accordingly, FIG. 6 illustrates a cross-sectional view of layers of the display panel 62 with the high resistivity shielding layer 78 formed over the front polarizer 80 and between the front polarizer 80 and the touch layer 88. As may be appreciated, the front polarizer 80 may be formed using a metal oxide, a conductive polymer, carbon nanotube (CNT), silver nanowire (AgNW), or another suitable material. In such embodiments, the front polarizer 80 may act as a conductive layer between the high resistivity shielding layer 78 and the conductor 82. Accordingly, with the front polarizer 80 functioning as a conductive layer, an additional conductive layer may not be formed on the high resistivity shielding layer 78. Furthermore, with the high resistivity shielding layer 78 further from the liquid crystal layer 74 (e.g., due to the thickness of the front polarizer 80), ESD protection of the display panel 62 may be improved.

Figure 7:
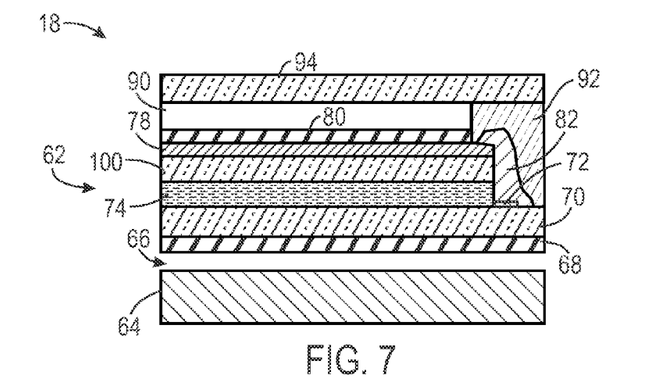
FIG. 7 is a cross-sectional view of layers of a display panel of an electronic display illustrating a shielding layer being formed between a color filter layer having on-cell touch features and a polarizer, in accordance with an embodiment.
Figure 8:
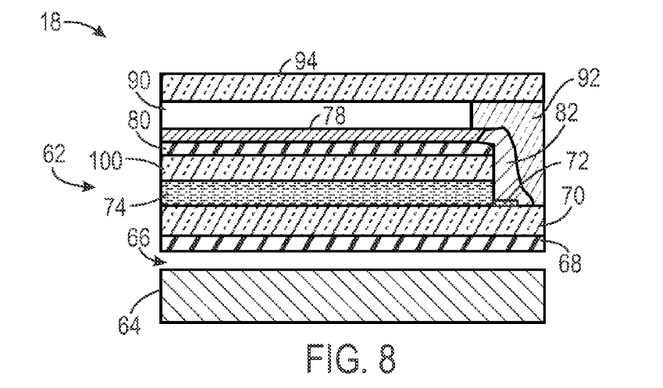
FIG. 8 is a cross-sectional view of layers of a display panel of an electronic display illustrating a shielding layer being formed over a color filter layer having on-cell touch features and over a polarizer, in accordance with an embodiment.

The high resistivity shielding layer 78 may be used in display panels 62 that incorporate on-cell touch features into the color filter layer 76. FIG. 7 illustrates a cross-sectional view of layers of such a display panel 62. Accordingly, a color filter layer 100 incorporates on-cell touch features so that touches may be sensed without a separate touch layer 88. Furthermore, as illustrated, the high resistivity shielding layer 78 is formed between the color filter layer 100 and the front polarizer 80. In contrast and as illustrated in FIG. 8, the high resistivity shielding layer 78 may be formed over the color filter layer 100 having the on-cell touch features and over the front polarizer 80. In such an embodiment, the front polarizer 80 may function as a conductive layer of the high resistivity shielding layer 78 as discussed above. Furthermore, ESD protection of the display panel 62 may be improved due to the high resistivity shielding layer 78 being further from the liquid crystal layer 74.

Figure 9:
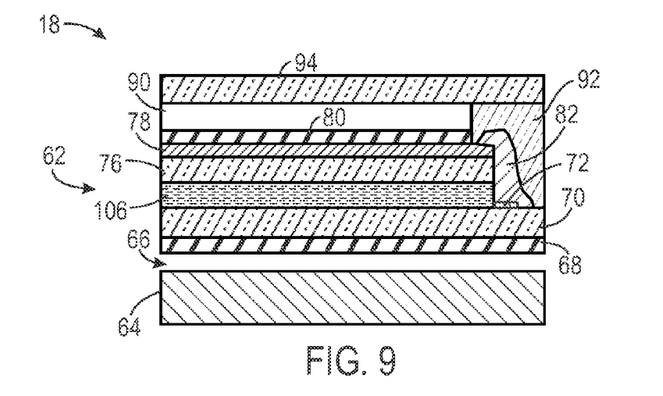
FIG. 9 is a cross-sectional view of layers of a display panel of an electronic display illustrating a shielding layer being formed between a liquid crystal layer having in-cell touch features and a polarizer, in accordance with an embodiment.
Figure 10:
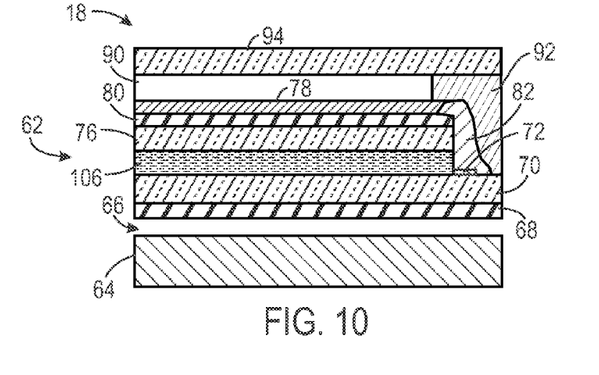
FIG. 10 is a cross-sectional view of layers of a display panel of an electronic display illustrating a shielding layer being formed over a liquid crystal layer having in-cell touch features and over a polarizer, in accordance with an embodiment.

The high resistivity shielding layer 78 may also be used in display panels 62 that incorporate in-cell touch features into liquid crystal layer 74. FIG. 9 illustrates a cross-sectional view of layers of such a display panel 62. As such, a liquid crystal layer 106 incorporates in-cell touch features so that touches may be sensed without a separate touch layer 88. In addition, the high resistivity shielding layer 78 is formed between the liquid crystal layer 106 and the front polarizer 80. As illustrated in FIG. 10, the high resistivity shielding layer 78 may also be formed over the liquid crystal layer 106 having in-cell touch features and over the polarizer layer 80. Accordingly, the front polarizer 80 may function as a conductive layer of the high resistivity shielding layer 78 and ESD protection of the display panel 62 may be improved (e.g., due to the high resistivity shielding layer 78 being further from the liquid crystal layer 106).

The display panel 62 may include a conductive layer that is separate from the front polarizer 80. Such a conductive layer may be formed between the high resistivity shielding layer 78 and the conductor 82 and may decrease the time it takes to discharge static from the high resistivity shielding layer 78. Accordingly, FIGS. 11 through 14 illustrate various configurations of such a conductive layer. For example, the conductive layer may include one or more conductive dots (e.g., FIG. 11), one or more conductive bars (e.g., FIG. 12), one or more conductive rings (e.g., FIG. 13), and/or a conductive ring and a conductive bar (e.g., FIG. 14) that may be formed between the high resistivity shielding layer 78 and the conductor 82.

Figure 11:
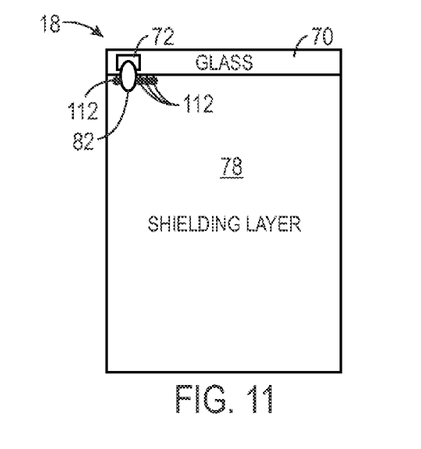
FIG. 11 is a top view of conductive dots coupled between a shielding layer and a grounding conductor to decrease a discharge time of static charges from the shielding layer, in accordance with an embodiment.

The conductive layer may include one or more conductive dots 112 formed on, and electrically coupled to, the high resistivity shielding layer 78, as illustrated in FIG. 11. Furthermore, the conductive dots 112 are electrically coupled to the conductor 82 and electrically coupled between the high resistivity shielding layer 78 and the conductor 82. Moreover, the conductive dots 112 provide a low resistance path between the high resistivity shielding layer 78 and the conductor 82 so that static charges may flow more quickly from the high resistivity shielding layer 78 to the conductor 82. Accordingly, the conductive dots 112 may be formed from any suitable conductive material (e.g., silver, CNT, carbon paste, AgNW, metallic material, and so forth). Although four conductive dots 112 are illustrated, any suitable number of conductive dots 112 may be used.

Figure 12:
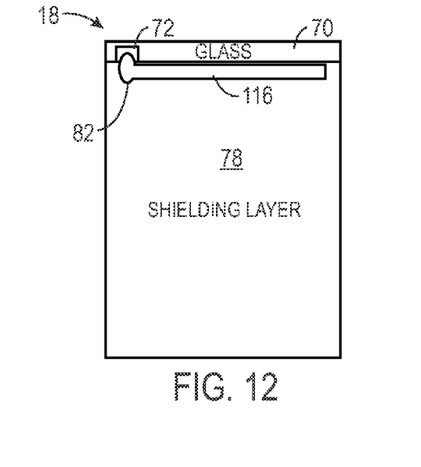
FIG. 12 is a top view of a conductive bar coupled between a shielding layer and a grounding conductor to decrease a discharge time of static charges from the shielding layer, in accordance with an embodiment.

As may be appreciated, the conductive layer may also include one or more conductive bars 116 formed on, and electrically coupled to, the high resistivity shielding layer 78, as illustrated in FIG. 12. In the present embodiment, the conductive bar 116 is electrically coupled to the conductor 82 and electrically coupled between the high resistivity shielding layer 78 and the conductor 82. Moreover, the conductive bar 116 provides a low resistance path between the high resistivity shielding layer 78 and the conductor 82 so that static charges may flow more quickly from the high resistivity shielding layer 78 to the conductor 82. Accordingly, similar to the conductive dots 112, the conductive bar 116 may be formed from any suitable conductive material (e.g., silver, CNT, carbon paste, AgNW, metallic material, and so forth). Although one conductive bar 116 is illustrated, any suitable number of conductive bars 116 may be used. In addition, the conductive bars 116 may be any suitable shape (e.g., curved, straight, uniform, non-uniform).

Figure 13:
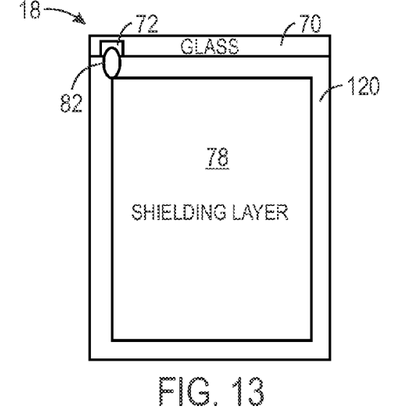
FIG. 13 is a top view of a conductive ring coupled between a shielding layer and a grounding conductor to decrease a discharge time of static charges from the shielding layer, in accordance with an embodiment.
Figure 14:
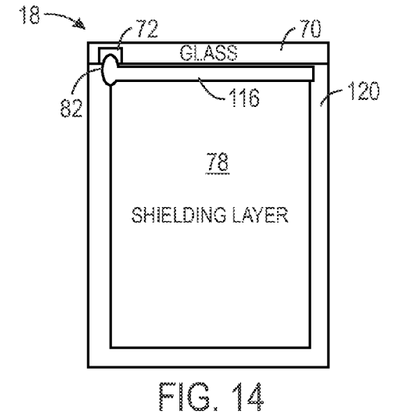
FIG. 14 is a top view of a conductive bar and a conductive ring coupled between a shielding layer and a grounding conductor to decrease a discharge time of static charges from the shielding layer, in accordance with an embodiment.

The conductive layer may include one or more conductive rings 120 formed on, and electrically coupled to, the high resistivity shielding layer 78, as illustrated in FIG. 13. Specifically, the conductive ring 120 is electrically coupled to the conductor 82 and electrically coupled between the high resistivity shielding layer 78 and the conductor 82. Moreover, the conductive ring 120 provides a low resistance path between the high resistivity shielding layer 78 and the conductor 82 so that static charges may flow more quickly from the high resistivity shielding layer 78 to the conductor 82. Accordingly, the conductive ring 120 may be formed from any suitable conductive material (e.g., silver, CNT, carbon paste, AgNW, metallic material, and so forth). Although one conductive ring 120 is illustrated, any suitable number of conductive rings 120 may be used. In addition, the conductive rings 120 may be any suitable shape (e.g., curved, straight, uniform, non-uniform, circle, square). As illustrated, the conductive ring 120 may be formed along an edge (e.g., border) of the high resistivity shielding layer 78; however, the conductive ring 120 may be formed along a different portion of the shielding layer 78. As illustrated in FIG. 14, the conductive ring 120 and the conductive bar 116 may both together form the conductive layer. As may be appreciated, in some embodiments the conductive layer may be formed using any combination of the conductive dots 112, the conductive bars 116, and/or the conductive rings 120.

Figure 15:
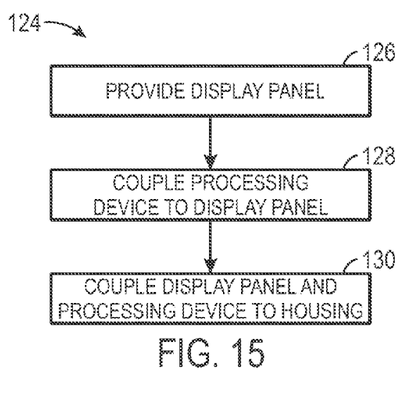
FIG. 15 is a flowchart describing a method for manufacturing a consumer electronic device having a display with a conductive layer coupled between a shielding layer and a grounding conductor, in accordance with an embodiment.

A consumer electronic device 10 may be manufactured with a display panel 62 having the high resistivity shielding layer 78 and a conductive layer electrically coupled between the high resistivity shielding layer 78 and the conductor 82. Accordingly, FIG. 15 is a flowchart describing a method 124 for manufacturing such a consumer electronic device 10. A display panel 62 may be provided (block 126). The display panel 62 may include the high resistivity shielding layer 78 configured to protect electrical components of the display panel 62 from static charges. The display panel 62 may also include a conductive layer (e.g., conductive dots 112, conductive bars 116, conductive rings 120) electrically coupled to the high resistivity shielding layer 78 and configured to increase a speed that static charges are directed from the high resistivity shielding layer 78. The display panel 62 may include the grounding layer 72 and the conductor 82 which is electrically coupled between the conductive layer and the grounding layer 72 to direct static charges from the conductive layer to the grounding layer 72. A processor 12 (e.g., processing device) may be coupled to the display panel 62 (block 128). Furthermore, the display panel 62 and the processor 12 may be coupled to a housing 32 (block 130).

Technical effects of the present disclosure include, among other things, decreasing the time that it takes to discharge static charges from an ESD shielding layer of the electronic device 10. By decreasing the static discharge time, image artifacts that may result from a static charge remaining on the ESD shielding layer may be reduced or removed. Accordingly, users of electronic devices may be able to view higher quality images on a display of the electronic device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display of an electronic device comprising:
  a high resistivity shielding layer configured to protect electrical components from static charges;
    a conductive layer electrically coupled to the high resistivity shielding layer and configured to decrease a discharge time of static charges from the high resistivity shielding layer, wherein the conductive layer comprises one or more conductive bars electrically coupled together;
  a grounding layer; and
    a conductor electrically coupled between the conductive layer and the grounding layer to direct static charges from the conductive layer to the grounding layer.

2. The display of claim 1, wherein the high resistivity shielding layer comprises indium tin oxide, indium zinc oxide, or any combination thereof.

3. The display of claim 1, wherein the high resistivity shielding layer comprises a resistance of greater than approximately 1000 ohms per square.

4. The display of claim 1, wherein the high resistivity shielding layer is configured to protect a display layer, a touch layer, or any combination thereof from static charges.

5. The display of claim 1, wherein the conductive layer comprises one or more conductive dots electrically coupled together.

6. The display of claim 1, wherein the conductive layer comprises a conductive ring disposed along a border of the high resistivity shielding layer.

7. The display of claim 1, wherein the conductive layer comprises a conductive ring disposed along a border of the high resistivity shielding layer and a conductive bar coupled to the conductive ring and to the conductor.

8. The display of claim 1, wherein the conductive layer comprises a metallic material.

9. The display of claim 8, wherein the metallic material comprises silver.

10. The display of claim 1, wherein the conductive layer comprises a carbon nanotube.

11. The display of claim 1, wherein the conductive layer comprises a conductive polarizer.

12. A method of manufacturing a consumer electronic device, comprising:
  providing a display panel, wherein the display panel comprises:
    a high resistivity shielding layer configured to protect electrical components of the display panel from static charges;

a conductive layer electrically coupled to the high resistivity shielding layer and configured to increase a speed that static charges are directed from the high resistivity shielding layer, wherein the conductive layer comprises one or more conductive bars electrically coupled together;

a grounding layer; and a conductor electrically coupled between the conductive layer and the grounding layer to direct static charges from the conductive layer to the grounding layer; and coupling a processing device to the display panel.

13. The method of claim 12, comprising coupling the display panel and the processing device to a housing.

14. A method of manufacturing a display panel for a display device, comprising:

providing a substrate;

forming a grounding layer over the substrate, wherein forming the grounding layer over the substrate comprises forming the grounding layer directly on a thin-film transistor layer;

forming a high resistivity shielding layer over the grounding layer, wherein the high resistivity shielding layer is configured to protect electrical components of the display panel from static charges;

forming a conductive layer directly on the high resistivity shielding layer, wherein the conductive layer is electrically coupled to the high resistivity shielding layer and configured to decrease a time that it takes to direct static charges from the high resistivity shielding layer; and forming a conductor directly on the grounding layer and the conductive layer to direct static charges from the conductive layer to the grounding layer.

15. The method of claim 14, wherein forming the high resistivity shielding layer over the grounding layer comprises forming the high resistivity shielding layer directly on a color filter glass layer.

16. The method of claim 14, wherein forming the high resistivity shielding layer over the grounding layer comprises forming the high resistivity shielding layer directly on a polarizer layer.

17. The method of claim 16, wherein forming the conductive layer directly on the high resistivity shielding layer comprises forming the polarizer layer directly on the high resistivity shielding layer.

18. The method of claim 14, wherein forming the high resistivity shielding layer over the grounding layer comprises forming the high resistivity shielding layer directly on a color filter glass layer, wherein the color filter glass layer comprises on-cell touch.

19. The method of claim 14, comprising forming a liquid crystal layer between the substrate and the high resistivity shielding layer, wherein the liquid crystal layer comprises in-cell touch.

20. A display device comprising:

a thin-film transistor layer;

a grounding layer disposed over the thin-film transistor layer;

a liquid crystal layer disposed over the grounding layer;

a color filter glass layer disposed over the liquid crystal layer;

a high resistivity shielding layer disposed over the color filter glass layer, the high resistivity shielding layer configured to protect electrical components from static charges;

a conductive layer disposed directly on the high resistivity shielding layer and configured to increase a speed that static charges are directed from the high resistivity shielding layer, wherein the conductive layer comprises one or more conductive bars electrically coupled together; and a conductor disposed between the conductive layer and the grounding layer to direct static charges from the conductive layer to the grounding layer.

21. The display device of claim 20, wherein the color filter glass layer comprises on-cell touch.

22. An electronic device comprising:

a liquid crystal display (LCD) panel comprising a plurality of display pixels arranged in rows and columns, wherein the display panel comprises:

a high resistivity shielding layer disposed over the display pixels and configured to protect the display pixels from static charges;

a conductive layer electrically coupled to the high resistivity shielding layer and configured to decrease a discharge time for static charges to be directed from the high resistivity shielding layer, wherein the conductive layer comprises one or more conductive bars electrically coupled together;

a grounding layer; and a conductor electrically coupled between the conductive layer and the grounding layer to direct static charges from the conductive layer to the grounding layer.

23. The electronic device of claim 22, wherein the conductive layer comprises a conductive ring disposed along a border of the high resistivity shielding layer.

24. The method of claim 12, wherein the high resistivity shielding layer comprises a resistance of greater than approximately 1000 ohms per square.

25. The method of claim 14, wherein the high resistivity shielding layer comprises a resistance of greater than approximately 1000 ohms per square.

26. The display device of claim 20, wherein the high resistivity shielding layer comprises a resistance of greater than approximately 1000 ohms per square.

27. The electronic device of claim 22, wherein the high resistivity shielding layer comprises a resistance of greater than approximately 1000 ohms per square.

* * * * *